US012607499B2

(12) United States Patent
Zhang et al.

(10) Patent No.: US 12,607,499 B2
(45) Date of Patent: Apr. 21, 2026

(54) VEHICLE WEIGHT DISTRIBUTION DETERMINATION

(71) Applicant: TUSIMPLE, INC., San Diego, CA (US)

(72) Inventors: Kun Zhang, San Diego, CA (US); Xiaoling Han, San Diego, CA (US); Zehua Huang, San Diego, CA (US); Charles A Price, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 154 days.

(21) Appl. No.: 18/678,226

(22) Filed: May 30, 2024

(65) Prior Publication Data

US 2024/0319000 A1 Sep. 26, 2024

Related U.S. Application Data

(63) Continuation of application No. 17/819,304, filed on Aug. 11, 2022, now Pat. No. 12,000,727, which is a
(Continued)

(51) Int. Cl.
| | |
|---|---|
| *G01G 19/08* | (2006.01) |
| *B60C 23/04* | (2006.01) |
| *B60W 40/13* | (2012.01) |

(52) U.S. Cl.
CPC ........... *G01G 19/086* (2013.01); *B60W 40/13* (2013.01); *B60C 23/0416* (2013.01); *B60G 2400/61* (2013.01); *B60W 2040/1307* (2013.01)

(58) Field of Classification Search
CPC ............... G01G 19/086; B60W 40/13; B60W 2040/1307; B60C 23/0416; B60G 2400/61
See application file for complete search history.

(56) References Cited

U.S. PATENT DOCUMENTS

| | | | |
|---|---|---|---|
| 4,964,679 A | 10/1990 | Rath | |
| 6,246,317 B1 | 6/2001 | Pickornik | |

(Continued)

FOREIGN PATENT DOCUMENTS

WO 2013190570 A1 12/2013

OTHER PUBLICATIONS

Iftikhar, K., et al., "Fault Detection with Sensor Fusion Using Intelligent Immune System", 2016 IEEE 7th Annual Information Technology, Electronics and Mobile Communication Conference (IEMCON), IEEE, 1-6.

(Continued)

*Primary Examiner* — Naeem Taslim Alam
(74) *Attorney, Agent, or Firm* — Perkins Coie LLP

(57) ABSTRACT

Techniques are described for determining weight distribution of a vehicle. A method of performing autonomous driving operation includes determining a vehicle weight distribution that values for each axle of the vehicle that describe weight or pressure applied on a respective axle. The values of the vehicle weight distribution are determined by removing at least one value that is outside a range of pre-determined values from a set of sensor values. The method further includes determining a driving-related operation of the vehicle weight distribution. For example, the driving-related operation may include determining a braking amount for each axle and/or determining a maximum steering angle to operate the vehicle. The method further includes controlling one or more subsystems in the vehicle via an instruction related to the driving-related operation. For example, transmitting the instruction to the one or more subsystems causes the vehicle to perform the driving-related operation.

20 Claims, 3 Drawing Sheets

Related U.S. Application Data continuation of application No. 16/989,623, filed on Aug. 10, 2020, now Pat. No. 11,441,937.

(60) Provisional application No. 62/886,280, filed on Aug. 13, 2019.

(56) References Cited

U.S. PATENT DOCUMENTS

| | | | |
|---|---|---|---|
| 6,363,331 | B1 | 3/2002 | Kyrtsos |
| 10,384,537 | B2 | 8/2019 | Flogard |
| 11,441,937 | B2 | 9/2022 | Zhang et al. |
| 2004/0083034 | A1 | 4/2004 | Brillon |
| 2005/0088293 | A1 | 4/2005 | Buck |
| 2006/0170168 | A1* | 8/2006 | Rotz ...................... B62D 61/12 180/209 |
| 2012/0173192 | A1 | 7/2012 | Song |
| 2013/0231837 | A1* | 9/2013 | Holbrook ................ F16H 48/22 701/69 |
| 2014/0207329 | A1* | 7/2014 | Juzswik .............. B60C 23/0447 701/32.7 |
| 2017/0158199 | A1 | 6/2017 | Pallett et al. |
| 2017/0166212 | A1* | 6/2017 | Flaum ................... B60W 10/12 |
| 2018/0236825 | A1 | 8/2018 | Hinz |
| 2019/0054907 | A1 | 2/2019 | Skrabak et al. |
| 2019/0176808 | A1 | 6/2019 | Gersten et al. |
| 2021/0048333 | A1 | 2/2021 | Zhang et al. |
| 2021/0396620 | A1 | 12/2021 | Jensen |
| 2022/0381602 | A1 | 12/2022 | Zhang et al. |

OTHER PUBLICATIONS

Extended European Search Report for European Application No. 20190661.7, mailed Dec. 8, 2020.
European Patent Office, Extended European Search Report for EP Appl. No. 23209116.5, issued Jan. 16, 2024, 0 pages.

* cited by examiner

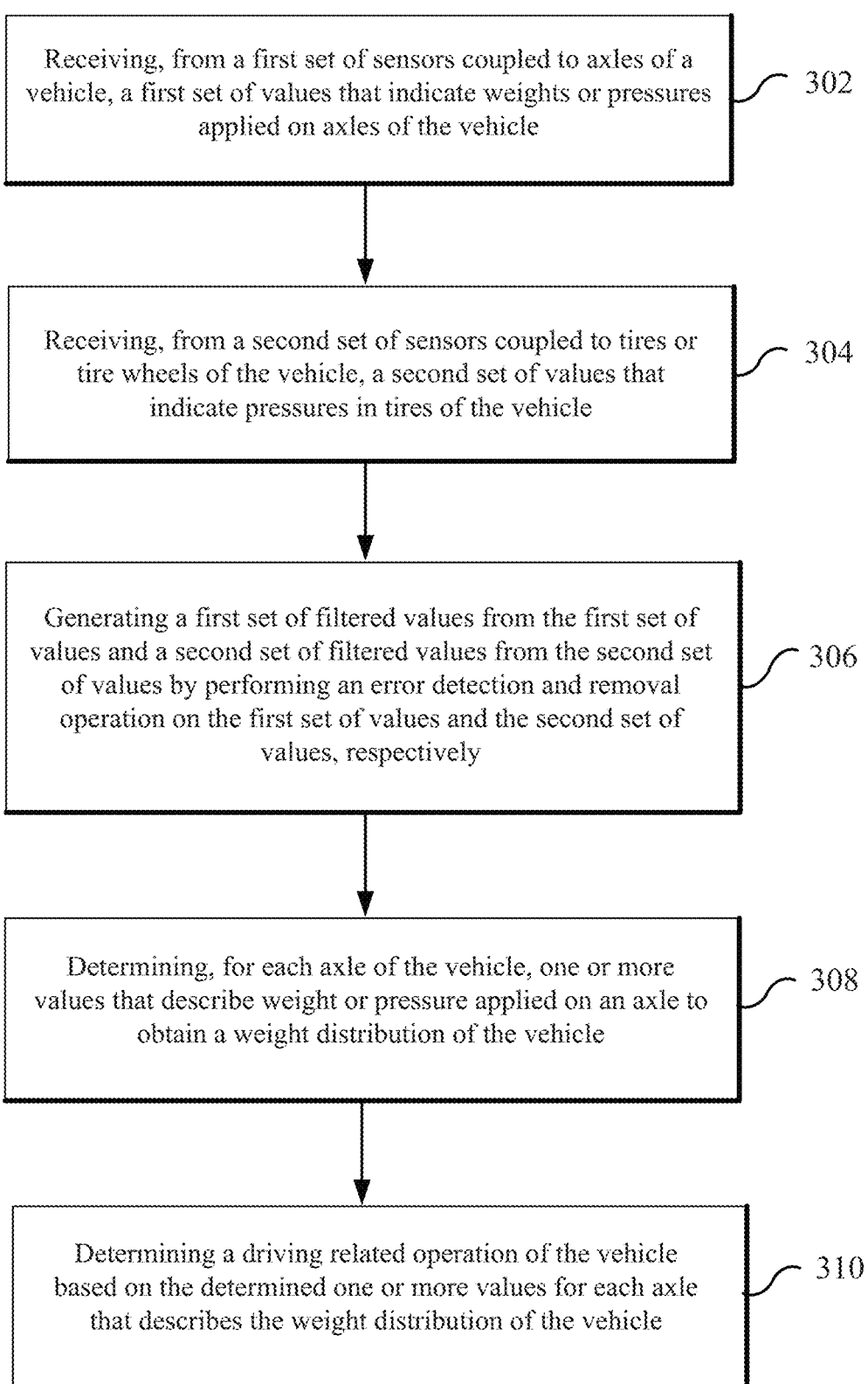

Receiving, from a first set of sensors coupled to axles of a vehicle, a first set of values that indicate weights or pressures applied on axles of the vehicle ⟋ 302

Receiving, from a second set of sensors coupled to tires or tire wheels of the vehicle, a second set of values that indicate pressures in tires of the vehicle ⟋ 304

Generating a first set of filtered values from the first set of values and a second set of filtered values from the second set of values by performing an error detection and removal operation on the first set of values and the second set of values, respectively ⟋ 306

Determining, for each axle of the vehicle, one or more values that describe weight or pressure applied on an axle to obtain a weight distribution of the vehicle ⟋ 308

Determining a driving related operation of the vehicle based on the determined one or more values for each axle that describes the weight distribution of the vehicle ⟋ 310

*FIG. 3*

VEHICLE WEIGHT DISTRIBUTION DETERMINATION

CROSS REFERENCE TO RELATED APPLICATIONS

This patent document is a continuation of U.S. Patent Application No. is Ser. No. 17/819,304, filed on Aug. 11, 2022, which is a continuation of U.S. application Ser. No. 16/989,623, filed on Aug. 10, 2020, now U.S. Pat. No. 11,441,937, which claims priority to and the benefit of U.S. Provisional Application No. 62/886,280, filed on Aug. 13, 2019. The aforementioned applications are incorporated herein by reference in their entireties.

TECHNICAL FIELD

This document relates to systems, apparatus, and methods to determine weight distribution in a vehicle.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself.

SUMMARY

When a vehicle is driven, the vehicle's operations is dependent at least in part on the weight of the vehicle. For example, a truck carrying a load (e.g., goods) will exert a greater force to drive and to stop as compared to the same truck without a load. This patent document describes systems, apparatus, and methods to determine weight distribution of a vehicle to enable an in-vehicle control computer located in the vehicle to determine vehicle driving operations based at least on the determined weight distribution.

In an exemplary embodiment, a method of performing autonomous driving operation, comprises receiving, from a first set of sensors coupled to axles of a vehicle, a first set of values that indicate weights or pressures applied on axles of the vehicle; receiving, from a second set of sensors coupled to tires or tire wheels of the vehicle, a second set of values that indicate pressures in tires of the vehicle; generating a first set of filtered values from the first set of values and a second set of filtered values from the second set of values by performing an error detection and removal operation on the first set of values and the second set of values, respectively; determining, for each axle of the vehicle, one or more values that describe weight or pressure applied on an axle to obtain a weight distribution of the vehicle, where the one or more values for each axle are based on at least one value from the first set of filtered values for an axle or at least two values from the second set of filtered values for at least two tires coupled to the axle; and determining a driving related operation of the vehicle based on the determined one or more values for each axle that describes the weight distribution of the vehicle.

In some embodiments, the error detection and removal operation includes removing at least one value from the first set of values that are outside a first range of pre-determined values, and the error detection and removal operation includes removing at least one value from the second set of values that are outside a second range of pre-determined values. In some embodiments, the error detection and removal operation includes removing at least one value from the first set of values or from the second set of values that fail to meet a statistical criterion. In some embodiments, the statistical criterion indicates that the at least one value is removed from the first set of values in response to the at least one value being more than one standard deviation from an average of the first set of values, or the statistical criterion indicates that the at least one value is removed from the second set of values in response to the at least one value being more than one standard deviation from an average of the second set of values.

In some embodiments, the determining the driving related operation of the vehicle comprises: determining, for each axle, a braking amount to control the extent to which brakes are engaged on an axle, wherein the braking amount for the axle is determined based on the one or more values for the axle. In some embodiments, a first braking amount for brakes of a first axle is greater than a second braking amount for brakes of a second axle in response to determining that the one or more values that describe the weight or the pressure applied on the first axle are greater than the one or more values that describe the weight or the pressure applied on the second axle. In some embodiments, the determining the driving related operation of the vehicle comprises: selecting a transmission gear to operate the vehicle based on a total value of the one or more values from either the first set of filtered values for multiple axles or the second set of filtered values for multiple tires, where the transmission gear is selected to be a first gear or a second gear for the vehicle driven from a stop position in response to the total value being greater than a pre-determined threshold that indicates that the vehicle includes goods. In some embodiments, the determining the driving related operation of the vehicle comprises: selecting a transmission gear to operate the vehicle based on a total value of the one or more values from either the first set of filtered values for multiple axles or the second set of filtered values for multiple tires, where the transmission gear is selected to be a second gear, a third gear or a fourth gear for the vehicle driven from the stop position in response to the total value being less than the pre-determined threshold that indicates that the vehicle includes an absence of goods.

In some embodiments, the determining the driving related operation of the vehicle is performed by: determining a maximum rate of steering to operate the vehicle based on a speed of the vehicle and a total value of the one or more values from either the first set of filtered values for the multiple axles or the second set of filtered values for the multiple tires. In some embodiments, the determining the driving related operation of the vehicle is performed by determining a maximum steering angle to operate the vehicle based at least on a total value of the one or more values from either the first set of filtered values for the multiple axles or the second set of filtered values for the multiple tires. In some embodiments, the one or more values for each axle are determined by: determining, for each axle, that a first value for an axle is a value from the first set of filtered values for the axle, or determining, for each axle coupled to at least two tires, that two or more values for the axle are values from the second set of filtered values that correspond to two or more tires coupled to the axle, and where the first value or the two or more values comprise the one or more values.

In some embodiments, the one or more values for each axle are determined by: determining, for each axle coupled to four tires, a second value for the axle as an average of two values from the second set of filtered values for two tires coupled to a first side of the axle; and determining, for each axle coupled to four tires, a third value for the axle as an average of two values from the second set of filtered values for two tires coupled to a second side of the axle opposite to the first side, and where the second value and the third value comprise the one or more values. In some embodiments, the first set of sensors are wireless sensors that measure weight or pressure applied on the multiple axles of the vehicle. In some embodiments, the second set of sensors are tire pressure monitoring system (TPMS) sensors that measure air pressure in tires.

In some embodiments, the error detection and removal operation includes removing at least one value from the first set of values or from the second set of values that fail to meet a statistical criterion, and the statistical criterion indicates that the at least one value is removed from the first set of values in response to the at least one value being more than a percentage of a median value of the first set of values, or the statistical criterion indicates that the at least one value is removed from the second set of values in response to the at least one value being more than a percentage of a median value of the second set of values.

In some embodiments, the weight or pressure applied on multiple axles include weight or pressure applied either by a structure of the vehicle without goods included in the vehicle or by the structure of the vehicle with goods included in the vehicle, where the method further comprises determining, for each axle, a weight or pressure applied on an axle by the goods included in the vehicle by comparing a value from the first set of filtered values for the axle with a previously measured weight or pressure applied on the same axle by the structure of the vehicle. In some embodiments, the pressure applied in multiple tires include weight or pressure applied either by a structure of the vehicle without goods included in the vehicle or by the structure of the vehicle with goods included in the vehicle. In some embodiments, the method further comprises determining, for each tire of each axle, a pressure applied in a tire by the goods included in the vehicle by comparing a value from the second set of filtered values for the tire with a previously measured pressure applied in the same tire by the structure of the vehicle.

In yet another exemplary aspect, the above-described method is embodied in a non-transitory computer readable program stored on a non-transitory computer readable media. The computer readable program includes code that when executed by a processor, causes the processor to perform the methods described in this patent document. In yet another exemplary embodiment, a device that is configured or operable to perform the above-described methods is disclosed. In yet another exemplary embodiment, a system that includes a computer with a processor that is configured or operable to perform the above-described methods is disclosed.

The above and other aspects and their implementations are described in greater detail in the drawings, the descriptions, and the claims.

BRIEF DESCRIPTION OF THE DRAWING

FIG. 3 shows a flow diagram to determine vehicle weight distribution.

DETAILED DESCRIPTION

Figure 1:
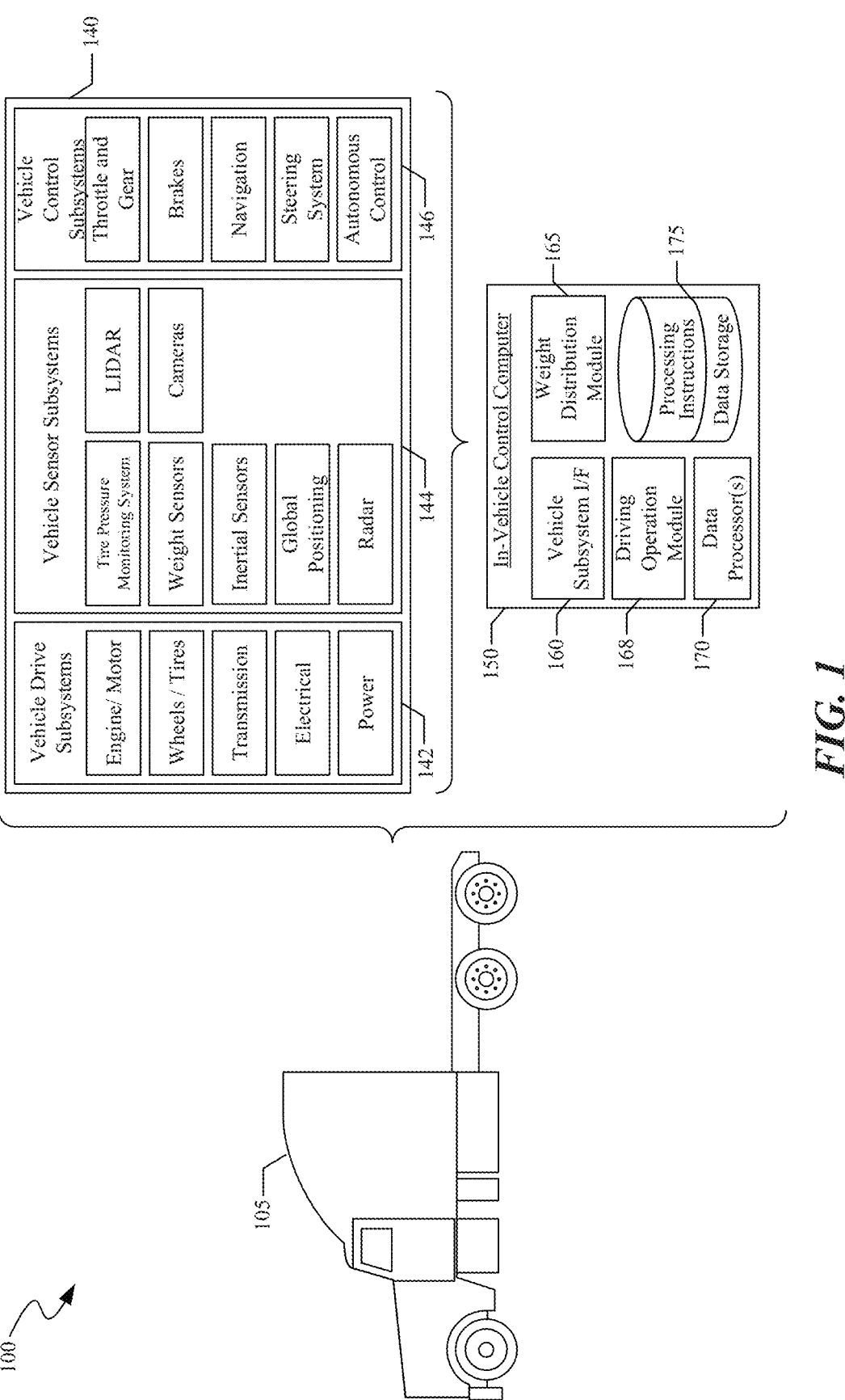
FIG. 1 shows a block diagram of an example vehicle ecosystem in which driving operations can be determined based on determining weight distribution of the semi-trailer truck.

Developments in autonomous driving technology have led to a development of semi-trailer truck that can be autonomously driven to deliver goods to a destination. A semi-trailer truck is a vehicle that can include a tractor unit where a driver sits in a cab and a trailer unit coupled to the tractor unit. The trailer unit may include goods that the semi-trailer truck delivers to a destination. When a semi-trailer trucks is driven in an autonomous mode, the semi-trailer truck can operate without much intervention from a human driver.

An in-vehicle control computer located in the semi-trailer truck can operate the semi-trailer truck in an autonomous mode by controlling various system of the semi-trailer truck. For example, the in-vehicle control computer can perform image processing on images obtained from cameras on the semi-trailer truck to determine the location of objects that surround the semi-trailer truck. Based on the image processing, the in-vehicle control computer can safely operate the semi-trailer truck by controlling a steering angle of the steering system, a throttle amount to control the speed of the vehicle, a transmission gear, and/or a braking amount to control the extent to which the brakes are engaged. Since the driving operations of the semi-trailer truck such a gear selection, braking, and steering is dependent at least in part on the weight of the semi-trailer truck, the in-vehicle control computer can determine the weight distribution of the vehicle to more effectively control the various systems in the semi-trailer truck.

Conventional systems measure a vehicle's weight by using inaccurate measurement techniques such as determining the vehicle's weight based on engine torque, brake torque, and/or data from an inertial measurement unit (IMU) on the vehicle. Unlike conventional weight measurement techniques, the technology described in this patent document can determine weight distribution of a vehicle based at least on wireless weight scale sensors that can measure the pressure and/or weight applied to a vehicle's axles and on the tire pressure monitoring system (TPMS) sensors that measure the air pressures of the vehicle's tires. The wireless weight scale sensors can wirelessly transmit weight information for each axle to a wireless receiver located in or communicably coupled to the in-vehicle control computer. In some embodiments, the TPMS system sensors for each tire can send the pressure information for each tire via the controller area network (CAN) bus to a CAN controller located in or communicably coupled to the in-vehicle control computer. In some embodiments, the TPMS system sensors for each tire can wirelessly send the pressure information for each tire to the wireless receiver located in or communicably coupled to the in-vehicle control computer.

The benefit of obtaining measured values from both the weight sensors and the TPMS sensors is that such measured values can be used to improve the reliability of the measured results. For example, as further explained in this patent document, the in-vehicle control computer can receive a measured value from a wireless weight sensor from an axle and can receive the measured values from TPMS sensors on the tires coupled to that axle. To determine whether any sensor is providing an erroneous measured value, the in-vehicle control computer compares the measured value from the wireless weight sensor to a first range of pre-determined values and the in-vehicle control computer compares the measured values from the TPMS sensors to a second range of pre-determined values. In such an embodiment, the in-vehicle control computer can remove one or more measured value that are considered to be erroneous from the set of measured values.

After any erroneous measured values are removed, the in-vehicle control computer can obtain the weight distribution of the vehicle by determining for each axle at least one value that describes weight or pressure applied on the axle, where the at least one value is based on the measured values from a wireless weight sensor on that axle and/or the TPMS sensors of the tires coupled to that axle. The in-vehicle control computer uses the determined weight distribution of the vehicle to determine various driving operations of the vehicle as further described in this patent document.

FIG. 1 shows a block diagram of an example vehicle ecosystem 100 in which driving operations can be determined based on determining weight distribution of the semi-trailer truck 105. The vehicle ecosystem 100 includes several systems and components that can generate and/or deliver one or more sources of information/data and related services to the in-vehicle control computer 150 that may be located in a semi-trailer truck 105. The in-vehicle control computer 150 can be in data communication with a plurality of vehicle subsystems 140, all of which can be resident in the semi-trailer truck 105. A vehicle subsystem interface 160 is provided to facilitate data communication between the in-vehicle control computer 150 and the plurality of vehicle subsystems 140. The vehicle subsystem interface 160 can include a wireless transmitter/receiver to communicate with wireless devices such as the wireless weight sensors and/or TPMS sensors. In some embodiments, the vehicle subsystem interface 160 can include a CAN controller to communicate with devices with a wired interface.

The semi-trailer truck 105 may include various vehicle subsystems that support of the operation of semi-trailer truck 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices (e.g., LiDAR or Radar shown in FIG. 1) can be removed without affecting the weight distribution related features described in this patent document. The vehicle drive subsystem 142 may include components operable to provide powered motion for the semi-trailer truck 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment or condition of the semi-trailer truck 105. The vehicle sensor subsystem 144 includes wireless weight sensors that can measure the weight and/or pressure applied to semi-trailer truck's axles and TPMS sensors that measure the air pressures of the semi-trailer truck's tires.

Figure 2:
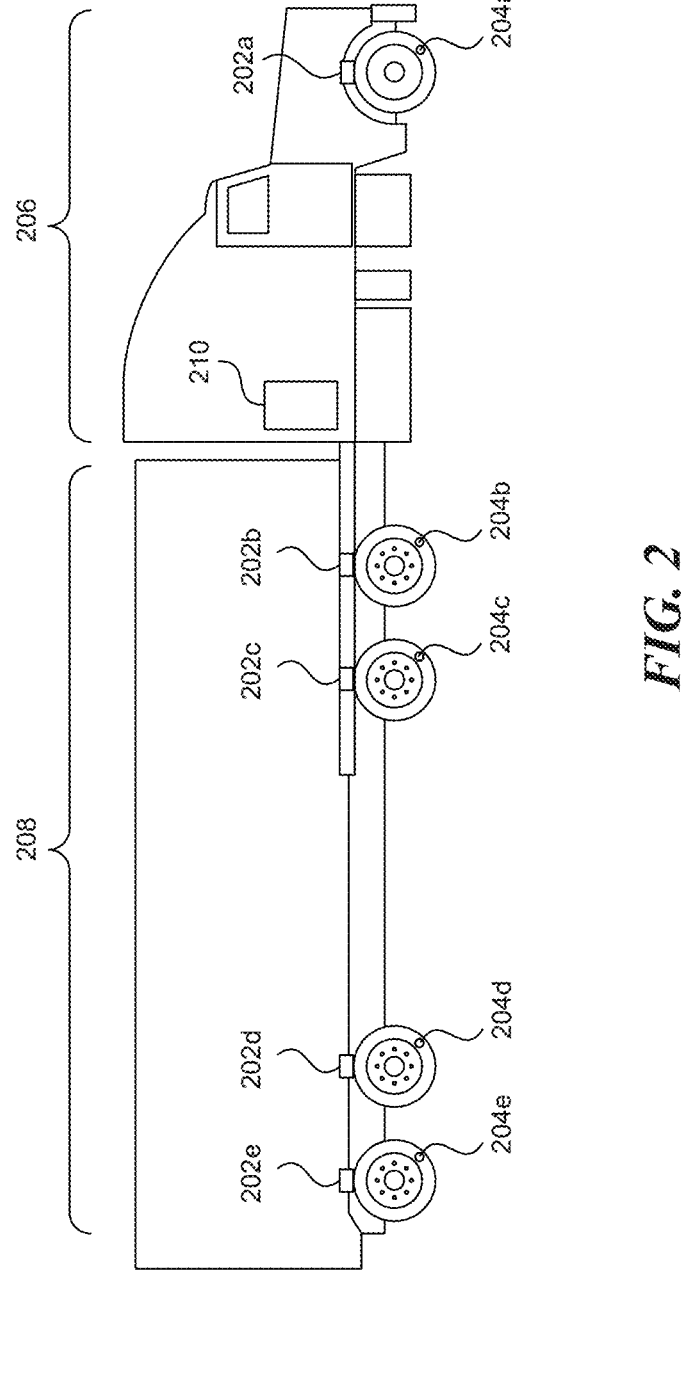
FIG. 2 shows a side view of a semi-trailer truck with wireless weight sensors and tire pressure monitoring system (TPMS) sensors.

FIG. 2 shows a side view of a semi-trailer truck 200 with approximate locations of the wireless weight sensors 202a-202e and the TPMS sensors 204a-204c. The semi-trailer truck 200 includes an in-vehicle control computer 210 that controls the various aspects of the semi-trailer truck and receives measurements from the wireless weight sensors 202a-202e and the TPMS sensors 204a-204c as described in this patent document. In FIG. 2, the exemplary semi-trailer truck 200 is shown to include five axles where each axle includes two or more tires coupled to an axle. The wireless weight sensors 202a-202e measure the weight and/or pressure applied to the five axles of the semi-trailer truck 200. In some embodiments, for each axle, a single wireless weight sensor can be coupled in between two hoses that supply compressed air from an air tank to an axle of the semi-trailer truck 200, where the air tanks can provide compressed air to operate the brakes and/or air suspension. For example, one hose can couple a wireless weight sensor to an air tank, and another hose can couple the same wireless weight sensor to component(s) of the air brakes and/or air suspension. In some embodiments, for each axle, more than one wireless weight sensor can be coupled in between the air tank and the components of the air brakes and/or air suspension to add redundancy so that if one of the wireless weight sensors fails, at least one other wireless weight sensor can provide the pressure and/or weight measurement of a load applied to an axle. Thus, the wireless weight sensors can be coupled to axles of the vehicle.

Each wireless weight sensor is configured to measure a pressure and/or weight applied on the axle by a load such as the tractor unit 206, the trailer unit 208, and/or any goods in the trailer unit 208. For example, in a semi-trailer truck 200, a tractor unit 206 can include three axles with one axle under the driver's cab in the front and two axles located at a rear of the tractor unit 206, and the trailer unit 208 can include two axles that are both located at a rear or the trailer unit. In this example, one or more wireless weight sensors (e.g., 202a) on the axle under the driver's cab of the tractor unit 206 can measure the pressure and/or weight supported by the front set of wheels, and one or more wireless weight sensors (e.g., 202b, 202c) on each of the two rear axles of the tractor unit 206 can measure the pressure and/or weight supported by the rear set of wheels of the tractor unit 206, and one or more wireless weight sensors (e.g., 202d, 202e) on each of the two rear axles of the trailer unit 208 can measure the pressure and/or weight supported by the rear set of wheels of the trailer unit 208.

The TPMS sensors 204a-204e measure the air pressures of the semi-trailer truck's tires. Since FIG. 2 shows a side view of the semi-trailer truck, only five TPMS sensors are shown for case of description. If the semi-trailer truck 200 has eighteen wheels, then one TPMS sensor is located in each tire of each wheel. Each TPMS sensor can be located on or in each tire or tire wheel of the semi-trailer truck 200 to measure air pressure within a tire. The TPMS sensors 204a-204e are coupled to the tires or tire wheels of the vehicle. For example, in a semi-trailer truck, a tractor unit 206 can include two front tires coupled to a front axle under the driver's cab, a set of four tires in each of a total of four axles located at a rear of the tractor unit 206 and at a rear of the trailer unit 208. In this example, each of the eighteen tires can have a TPMS sensor that can measure an air pressure for each tire.

In FIG. 1, the vehicle subsystem interface 160 of the in-vehicle control computer 150 can include a wireless receiver and/or a CAN controller that can receive signals transmitted or sent by the wireless weight sensors and the TPMS sensors and send the values in the received signals to the weight distribution module 165 for further processing. The weight distribution module 165 receives from the wireless weight sensors a first set of values that indicate weights or pressures applied on axles of the vehicle. For example, for each axle of the vehicle, at least one wireless weight sensor can measure the weight and/or pressure applied on an axle. In some implementations where a semi-trailer truck has three axles on the tractor unit and two axles on the trailer unit for a total of five axles, the wireless weight sensors may provide a total of five weight or pressure measurements that describe the weight or pressure applied on each axle. In embodiments where at least two wireless weight sensors measure the pressure or weight on each of the five axles for redundancy, the wireless eight sensors may provide a total of ten weight or pressure measurements.

The weight distribution module 165 also receives from the TPMS sensors a second set of values that indicate pressures in tires of the vehicle. For example, one TPMS sensor can be located on or in each tire of the vehicle coupled to an axle so that each TPMS sensor can measure the pressure in one tire. In some implementations where a semi-trailer truck has a total of eighteen wheels on a total of five axles, the TPMS sensors may provide a total of eighteen pressure measurements that describe the air pressure in each tire.

After the weight distribution module 165 receives the first set of values and the second set of values, the weight distribution module 165 perform an error detection and removal operation to remove or filter out any values that are considered erroneous. There may be several scenarios where one or more sensors may provide erroneous measurement values. For example, a wireless weight sensor may have a low battery charge and may not provide accurate weight or pressure measurement, or a TPMS sensor may be malfunctioning and may provide inaccurate air pressure measurement. Thus, one of the technical benefits of the error detection and removal operation is that it can exclude erroneous measured values from affecting the in-vehicle control computer's decisions to control the driving related operations of the vehicle as further described in this patent document. Thus, by performing the error detection and removal operation, the in-vehicle control computer can obtain reliable measured values, which can enable the in-vehicle control computer to reliably control devices on the vehicle to operate the vehicle.

The weight distribution module 165 can perform the error detection and removal operation on the measurements obtained from the wireless weight sensors in several beneficial ways to provide reliable measured values. For example, the weight distribution module 165 can determine that one or more values from the first set of values are erroneous if one or more values from the first set fall outside a first range of pre-determined values (e.g., 10,000 lbs. to 70,000 lbs.). After one or more erroneous values are removed from the first set of values, the weight distribution module 165 obtains a first set of filtered values. In some embodiments, the upper and lower bounds the first range of pre-determined values can be selected so that any weight or pressure measurement obtained for an axle that falls outside such a range could be considered erroneous. For example, during a calibration operation, the lower bound of the first range can be determined to be the average force applied by the vehicle's structure on the axles (e.g., just the tractor unit and the trailer unit without any goods in the trailer unit and with or without driver(s)), and the upper bound of the first range can be the average value of the force exerted on the axles by a trailer unit that is fully loaded with goods.

In another example, the weight distribution module 165 can also perform the error detection and removal operation on the measurements obtained from the TPMS sensors. The weight distribution module 165 can determine that one or more values from the second set of values are erroneous if one or more values from the second set fall outside a second range of pre-determined values (e.g., 70 psi to 110 psi). After one or more erroneous values are removed from the second set of values, the weight distribution module 165 obtains a second set of filtered values. In some embodiments, the upper and lower bounds the second range of pre-determined values can be selected so that any air pressure measurement obtained for the tires that falls outside such a range could be considered erroneous. For example, during a calibration operation, the lower bound of the second range can be determined to be slightly less than the average pressure of the tires when the vehicle does not include any goods (e.g., 90% of the average pressure of the tires when vehicle is empty), and the upper bound of the second range can be slightly more than the average value of the air pressure of the tires when a vehicle is fully loaded with goods (e.g., 120% of the average pressure of the tires when vehicle is fully loaded).

In yet another example, the weight distribution module 165 can also perform the error detection and removal operation on the first set of values obtained from the wireless weight sensors and the second set of values obtained from the TPMS sensors by removing one or more values from the respective sets that fail to meet a statistical criterion. For example, one or more values in the first set of values that are more than one standard deviation from the average of the first set of values are removed from the first set to obtain the first set of filtered values. In another example, one or more values in the first set of values that are more than 20% of the median value in the first set of values are removed from the first set to obtain the first set of filtered values. The second set of values may be statistically filtered in a similar or same manner as the first set of values as explained in this patent document.

After the error detection and removal operation is performed, the weight distribution module 165 determines, for each axle, one or more weight distribution values that describe weight or pressure applied on an axle to obtain a weight distribution of the vehicle. For axle, the one or more values can be obtained from either the first set of values or the second set of values or combination of the first and second set of values. Continuing with the example from above where the semi-trailer truck includes a total of five axles and eighteen tires, if after the error detection and filtering operation, the first set of values includes five measured values and the second set of values includes eighteen measured values, then the one or more values for each axle may include (1) a single measured value from the first set of values measured by the wireless weight sensors, or (2) two or more air pressure values measured for two or more tires coupled to each axle, or (3) for axles that include four tires coupled to an axle, a first average value of two air pressure values of two tires coupled to a first side of the axle and a second average value of two air pressure values of two tires coupled to a second side of the same axle opposite to the first side, or any combination of (1), (2), and (3). After the one or more weight distribution values for each axle is determined, the weight distribution module 165 may provide these values to the driving operation module 168 that is configured to determining a driving related operation of the vehicle control subsystems 146 based on the determined weight distribution of the vehicle.

In some embodiments, the one or more weight distribution values for each axle can be stored by the in-vehicle control computer 150 in data storage device 175 so that the in-vehicle control computer 150 can use it to compare to one or more weight distribution values determined later in time to determine any change in the weight distribution of the vehicle. For example, a first set of one or more weight distribution values can relate to weight or pressure applied on the multiple axles and the pressure applied in the multiple tires by a structure of the semi-trailer truck (e.g., just the tractor unit and the trailer unit without any goods in the trailer unit and with or without driver(s)), and a second set of one or more weight distribution values can relate to weight or pressure applied on the multiple axles and the pressure applied in the multiple tires by the structure of the semi-trailer truck that includes goods.

In the above example, the difference in the weight or pressure values can be used to determine the weight of the goods. The weight or pressure applied on the multiple axles and the pressure applied in the multiple tires are applied either by a structure of the semi-trailer truck or by the structure of the semi-trailer truck with goods included in the semi-trailer truck. In some embodiments, a weight or pressure applied on each axle by the goods included in the semi-trailer truck can be determined by comparing a value from the first set of filtered values for the axle with a previously measured weight or pressure applied on the same axle by the structure of the vehicle. In some embodiments, when goods are added to the trailer unit, the pressure within one or more tires can increase. For example, the pressure applied on each tire by the goods can be determined by comparing a value from the second set of filtered values for the tire with a previously measured pressure applied in the same tire by the structure of the vehicle. Based on the difference in pressure values, the weight distribution module 165 can determine a total weight of the goods in the semi-trailer truck.

The vehicle control subsystem 146 may be configured to control operation of the semi-trailer truck 105 and its components. Accordingly, the vehicle control subsystem 146 may include various elements such as a throttle and gear, a brake unit, a navigation unit, a steering system and/or an autonomous control unit. The throttle may be configured to control, for instance, the operating speed of the engine and, in turn, control the speed of the semi-trailer truck 105. The gear may be configured to control the gear selection of the transmission. The brake unit can include any combination of mechanisms configured to decelerate the semi-trailer truck 105. The brake unit can use friction to slow the wheels in a standard manner. The navigation unit may be any system configured to determine a driving path or route for the semi-trailer truck 105. The navigation unit may additionally be configured to update the driving path dynamically while the semi-trailer truck 105 is in operation. In some embodiments, the navigation unit may be configured to incorporate data from the GPS transceiver and one or more predetermined maps so as to determine the driving path for the semi-trailer truck 105. The steering system may represent any combination of mechanisms that may be operable to adjust the heading of semi-trailer truck 105 in an autonomous mode or in a driver-controlled mode.

The autonomous control unit may represent a control system configured to identify, evaluate, and avoid or otherwise negotiate potential obstacles in the environment of the semi-trailer truck 105. In general, the autonomous control unit may be configured to control the semi-trailer truck 105 for operation without a driver or to provide driver assistance in controlling the semi-trailer truck 105. In some embodiments, the autonomous control unit may be configured to incorporate data from the GPS transceiver, the RADAR, the LIDAR, the cameras, and/or other vehicle subsystems to determine the driving path or trajectory for the semi-trailer truck 105.

In some embodiments, the driving operation module 168 can control the driving operations of the various elements of the vehicle control subsystem 146 based on the information provided by the weight distribution module 165. For example, the driving operation module 168 can determine, for each axle, an amount of braking to control the extent to which brakes are engaged on an axle, where the amount of braking for each axle is determined based on the one or more weight distribution values obtained by the driving operation module 168 from the weight distribution module 165.

For example, based on the weight distribution values, the driving operation module 168 can determine that a semi-trailer truck includes goods that may be heavier towards the front of the trailer unit behind the tractor unit than towards the rear of the trailer unit. In such an example, the vehicle may be considered "front heavy" and the driving operation module 168 can provide braking amounts for brakes of the three axles on the tractor unit located towards the front of the semi-trailer truck that is higher than the braking amounts for brakes of two axles on the trailer unit located towards the rear of the semi-trailer truck. Thus, a driving operation module 168 can determine that a first braking amount for brakes of any one or more of the three axles of the tractor unit is greater than a second braking amount for brakes of any one or more of the two axles of the trailer unit if the driving operation module 168 determines that the one or more values that describe the weight or the pressure applied on any one of the three axles of the tractor unit are greater than the one or more values that describe the weight or the pressure applied on any one of the two axles of the trailer unit.

In the example above where the truck is front heavy, if the same braking amount is applied to all the tires, then the rear tires may skid causing the distance needed by the vehicle to come to a complete stop. Such a scenario can be dangerous if the distance needed by the semi-trailer truck to stop is greater than the distance from the semi-trailer truck to another vehicle stopped in front of the semi-trailer truck. Thus, a technical benefit of controlling the braking amount per axle is that it can allow the semi-trailer truck to engage the anti-lock braking system (ABS) of each tire at the same or approximately the same time (e.g., within a time frame of 1 to 2 seconds) so that the semi-trailer truck can minimize as much as possible the distance needed to stop.

In another example, the driving operation module 168 can determine which transmission gear to select to operate the vehicle based on a total weight or pressure value of the one or more weight distribution values from the measured and filtered values obtained from either the wireless weight scales or from the TPMS sensors. In some embodiments where the driving operation module 168 can determine that a semi-trailer truck includes goods and thus selects an appropriate gear by comparing the total weight or pressure value to a pre-determined threshold. For example, if the pre-determined threshold is set to a total weight of the structure of the semi-trailer truck (e.g., just the tractor unit and the trailer unit without any goods in the trailer unit and with or without driver(s)), and if the driving operation module 168 determines that the total weight or pressure value is greater than the pre-determined threshold, then the driving operation module 168 can select a first gear or a second gear when the semi-trailer truck is driven from a stop position where the semi-trailer truck has come to a stop. In another example, if the driving operation module 168 determines that the total weight or pressure value is less than the pre-determined threshold indicating that the semi-trailer truck does not include any goods, then the driving operation module 168 can select a second gear or a third gear or a fourth gear when the semi-trailer truck is driven from a stop position.

In yet another example, the driving operation module 168 can determine a maximum steering angle or maximum rate of steering (e.g., maximum steering yaw rate) of the semi-trailer truck 105 based on the total weight or pressure value (as explained above) and based on the speed of the semi-trailer truck 105. When a semi-trailer truck is driven faster than one or more speed threshold values, and/or if the semi-trailer truck is carrying a load greater than a threshold value, then the driving operation module 168 can limit the maximum steering angle or the maximum rate of steering to prevent the semi-trailer truck from tipping over.

For example, if the semi-trailer truck's speed is greater than a pre-determined value (e.g., 40 mph) and if the total weight or pressure value is less than another pre-determined value (e.g., 40,000 lbs.), then the maximum steering angle and/or the maximum rate of steering may be respectively set to a first value and/or the second value, respectively. And, if the semi-trailer truck's speed is greater than a pre-determined value and if the total weight or pressure value is greater than the another pre-determined value, then the maximum steering angle and/or the maximum rate of steering may be respectively set to a third value and/or a fourth value, respectively. In this example, the first value is greater than the third value and where the second value is greater than the fourth value, which indicates that the maximum steering angle or maximum rate of steering is higher for a slower semi-trailer truck carrying a load than a faster semi-trailer truck carrying the same load.

In some embodiments, the driving operation module 168 can use an exemplary lookup table as shown in Table 1 below to determine a maximum rate of steering (e.g., maximum steering yaw rate) based on the speed of the vehicle (shown on top column of Table 1) and based on the total weight of the vehicle (shown in the left row of Table 1). The yaw rate is shown in degrees/second and can range, for example, from 3 deg/sec to 40 deg/sec. Thus, for example, if the semi-trailer truck's speed is greater than or equal to 10 mph but less than 20 mph, and if the semi-trailer trucks' weight is 20000 kg, then the driving operation module 168 can determine based on Table 1 that the maximum steering yaw rate should be 12 degrees/second.

TABLE 1

| Speed to Weight to Yaw Rate | | | | |
|---|---|---|---|---|
| | Speed(m/s) | | | |
| Weight(kg) | 0 | 10 | 20 | 30 |
| 10000 | 40 | 18 | 14 | 8 |
| 20000 | 40 | 12 | 10 | 6 |
| 30000 | 40 | 10 | 7 | 4 |
| 40000 | 40 | 8 | 5 | 3 |

Returning to the vehicle sensor subsystem 144, in some embodiments the vehicle sensor subsystem 144 may also include an inertial measurement unit (IMU), a Global Positioning System (GPS) transceiver, a RADAR unit, a laser range finder/LIDAR unit, and/or one or more cameras or image capture devices. The vehicle sensor subsystem 144 may also include sensors configured to monitor internal systems of the semi-trailer truck 105 (e.g., an $O_2$ monitor, a fuel gauge, an engine oil temperature).

The IMU may include any combination of sensors (e.g., accelerometers and gyroscopes) configured to sense position and orientation changes of the semi-trailer truck 105 based on inertial acceleration. The GPS transceiver may be any sensor configured to estimate a geographic location of the semi-trailer truck 105. For this purpose, the GPS transceiver may include a receiver/transmitter operable to provide information regarding the position of the semi-trailer truck 105 with respect to the Earth. The RADAR unit may represent a system that utilizes radio signals to sense objects within the local environment of the semi-trailer truck 105. In some embodiments, in addition to sensing the objects, the RADAR unit may additionally be configured to sense the speed and the heading of the objects proximate to the semi-trailer truck 105. The laser range finder or LIDAR unit may be any sensor configured to sense objects in the environment in which the semi-trailer truck 105 is located using lasers. The cameras may include one or more devices configured to capture a plurality of images of the environment of the semi-trailer truck 105. The cameras may be still image cameras or motion video cameras.

Many or all of the functions of the semi-trailer truck 105 can be controlled by the in-vehicle control computer 150. The in-vehicle control computer 150 may include at least one data processor 170 (which can include at least one microprocessor) that executes processing instructions stored in a non-transitory computer readable medium, such as the data storage device 175 or memory. The in-vehicle control computer 150 may also represent a plurality of computing devices that may serve to control individual components or subsystems of the semi-trailer truck 105 in a distributed fashion. In some embodiments, the data storage device 175 may contain processing instructions (e.g., program logic) executable by the data processor 170 to perform various methods and/or functions of the semi-trailer truck 105, including those described for the weight distribution module 165 and the driving operation module 168 as explained in this patent document. For instance, the data processor 170 executes the operations associated with weight distribution module 165 for determining the weight distribution of the vehicle based on values measured by the wireless weight sensors and the TPMS sensors. And, the data processor 170 executes the operations associated with driving operation module 168 for determining various driving related operations of the semi-trailer truck 105 based on the weight distribution values determined by the weight distribution module 165.

The data storage device 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 can be configured to include a data processor 170 and a data storage device 175. The in-vehicle control computer 150 may control the function of the semi-trailer truck 105 based on inputs received from various vehicle subsystems (e.g., the vehicle drive subsystem 142, the vehicle sensor subsystem 144, and the vehicle control subsystem 146).

FIG. 3 shows a flow diagram to determine vehicle weight distribution. At the receiving operation 302, a weight distribution module of the in-vehicle control computer receives a first set of values are received from a first set of sensors coupled to axles of a vehicle, where the first set of values indicate weights or pressures applied on axles of the vehicle. At the receiving operation 304, a weight distribution module receives, from a second set of sensors coupled to tires or to tire wheels of the vehicle, a second set of values that indicate pressures in tires of the vehicle.

At the generating operation 306, the weight distribution module generates a first set of filtered values from the first set of values and a second set of filtered values from the second set of values by performing an error detection and removal operation on the first set of values and the second set of values, respectively. In some embodiments, the error detection and removal operation includes removing one or more values from the first set of values that are outside a first range of pre-determined values, and the error detection and removal operation includes removing one or more values from the second set of values that are outside a second range of pre-determined values. In some embodiments, the error detection and removal operation includes removing one or more values from the first set of values or from the second set of values that fail to meet a statistical criterion.

At the determining operation 308, the weight distribution module determines, for each axle of the vehicle, one or more values that describe weight or pressure applied on an axle to obtain a weight distribution of the vehicle. The one or more values for each axle are based on at least one value from the first set of filtered values for an axle or at least two values from the second set of filtered values for at least two tires coupled to the axle. In some embodiments, the one or more values for each axle are determined by: determining, for each axle, that a first value for an axle is a value from the first set of filtered values for the axle, or determining, for each axle coupled to at least two tires, that two or more values for the axle are values from the second set of filtered values that correspond to two or more tires coupled to the axle, or determining, for each axle coupled to four tires, that a second value for the axle is an average of two values from the second set of filtered values for two tires coupled to a first side of the axle and a third value for the axle is an average of two values from the second set of filtered values for two tires coupled to a second side of the axle opposite to the first side, and where the first value, or the two or more values, or the second value and the third value comprise the one or more values.

At the determining operation 310, the driving operation module determines a driving related operation of the vehicle based on the determined one or more values for each axle that describes the weight distribution of the vehicle. The driving operation module can obtain the one or more values from the weight distribution module.

In some embodiments, the determining the driving related operation of the vehicle comprises: determining, for each axle, a braking amount to control the extent to which brakes are engaged on an axle, where the braking amount for the axle is determined based on the one or more values for the axle, and where a first braking amount for brakes of a first axle is greater than a second braking amount for brakes of a second axle in response to determining that the one or more values that describe the weight or the pressure applied on the first axle are greater than the one or more values that describe the weight or the pressure applied on the second axle.

In some embodiments, the determining the driving related operation of the vehicle comprises: selecting a transmission gear to operate the vehicle based on a total value of the one or more values from either the first set of filtered values for the multiple axles or the second set of filtered values for the multiple tires, where the transmission gear is selected to be a first gear or a second gear for the vehicle driven from a stop position in response to the total value being greater than a pre-determined threshold that indicates that the vehicle includes goods, and where the transmission gear is selected to be the second gear, a third gear or a fourth gear for the vehicle driven from the stop position in response to the total value being less than the pre-determined threshold that indicates that the vehicle includes an absence of goods.

In some embodiments, the determining the driving related operation of the vehicle comprises: determining a maximum steering angle or a maximum rate of steering to operate the vehicle based on a speed of the vehicle and a total value of the one or more values from either the first set of filtered values for the multiple axles or the second set of filtered values for the multiple tires.

In some embodiments, the weight or pressure applied on the multiple axles and the pressure applied in the multiple tires include weight or pressure applied either by a structure of the vehicle without goods included in the vehicle or by the structure of the vehicle with goods included in the vehicle. In some embodiments, the method of FIG. 3 further comprises determining, for each axle, a weight or pressure applied on an axle by the goods included in the vehicle by comparing a value from the first set of filtered values for the axle with a previously measured weight or pressure applied on the same axle by the structure of the vehicle, and determining, for each tire of each axle, a pressure applied in a tire by the goods included in the vehicle by comparing a value from the second set of filtered values for the tire with a previously measured pressure applied in the same tire by the structure of the vehicle.

In some embodiments, the first set of sensors are wireless sensors that measure weight or pressure applied on the multiple axles of the vehicle, and where the second set of sensors are tire pressure monitoring system (TPMS) sensors that measure air pressure in tires.

The operations described in FIG. 3 can be performed by a weight distribution module 165 and/or the driving operation module 168 of an in-vehicle control computer as described in FIG. 1.

In this document the term "exemplary" is used to mean "an example of" and, unless otherwise stated, does not imply an ideal or a preferred embodiment. In the patent document the term "semi-trailer truck" is used to describe features of determining weight distribution to determine driving operation of the semi-trailer truck. However, the weight distribution determination techniques described can be applied to other kinds of vehicles having two or more axles.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer-or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations. enhancements and variations can be made based on what is described and illustrated in this disclosure.

What is claimed is:

1. A method of performing an autonomous driving operation, comprising:
  receiving a set of filtered values describing weight or pressure applied on axles of a vehicle at a first time;
  determining, from the set of filtered values, one or more weight values for the respective axles;
  determining a change in a weight distribution of the vehicle by comparing, by a computer located in the vehicle, the one or more weight values to weight values of the vehicle acquired at a time that is later than the first time;
  determining, by the computer, a driving-related operation of the vehicle based on the change; and
  causing an autonomous driving operation of the vehicle to be performed by executing the driving-related operation.

2. The method of claim 1, wherein the vehicle at the first time includes goods, and wherein the change indicates a weight of the goods.

3. The method of claim 1, wherein the set of filtered values are filtered by performing an error detection and removal operation on a first set of values obtained from a first set of sensors coupled to axles of the vehicle and a second set of values obtained from a second set of sensors coupled to tires or wheels of tires of the vehicle.

4. The method of claim 3, wherein the error detection and removal operation includes removing at least one value from the first set of values that are outside a first range of pre-determined values, and wherein the error detection and removal operation includes removing at least one value from the second set of values that are outside a second range of pre-determined values.

5. The method of claim 3, wherein the first set of sensors are wireless sensors that measure weight or pressure applied on the axles of the vehicle.

6. The method of claim 1, wherein the weight values at the time that is later than the first time are acquired for the same axles used to determine the weight distribution of the vehicle at the first time.

7. The method of claim 1, wherein determining the driving-related operation of the vehicle comprises:
  determining braking amounts to control an extent to which brakes are engaged on the axles, wherein the braking amounts are determined based on the weight distribution.

8. The method of claim 1, wherein determining the driving-related operation of the vehicle includes selecting a transmission gear to operate the vehicle based on the set of filtered values.

9. A system for autonomous vehicle operation comprising a computer that comprises a processor, configured to implement a method which causes the processor to:
  receive a set of filtered values describing weight or pressure applied on axles of a vehicle at a first time;
  determine, from the set of filtered values, one or more weight values for the respective axles;
  determine a change in a weight distribution of the vehicle by comparing, by a computer located in the vehicle, the one or more weight values to weight values of the vehicle acquired at a time that is later than the first time;
  determine, by the computer, a driving-related operation of the vehicle based on the change; and
  cause an autonomous driving operation of the vehicle to be performed by executing the driving-related operation.

10. The system of claim 9, wherein, in order to determine the driving-related operation of the vehicle, the processor is further configured to:
  determine a maximum rate of steering to operate the vehicle based on a speed of the vehicle and a total value from the set of filtered values.

11. The system of claim 9, wherein the change in the weight distribution indicates an absence of goods in the vehicle at the time that is later in time than the first time.

12. The system of claim 9, wherein determining the driving-related operation of the vehicle comprises:

determining braking amounts to control an extent to which brakes are engaged on the axles, wherein the braking amounts are determined based on the weight distribution.

13. The system of claim 9, wherein the weight or pressure applied on the axles of the vehicle at the first time is applied either by a structure of the vehicle or by the structure of the vehicle with goods included in the vehicle.

14. The system of claim 9, wherein the set of filtered values are filtered based on a first set of values obtained from a first set of sensors coupled to axles of the vehicle and a second set of values obtained from a second set of sensors coupled to tires or wheels of tires of the vehicle.

15. The system of claim 14, wherein the second set of sensors are tire pressure monitoring system (TPMS) sensors that measure air pressure in tires.

16. The system of claim 15, wherein the TPMS sensors are communicably coupled to the computer via a controller area network (CAN) bus to send air pressure measurements to the computer.

17. A non-transitory computer-readable program storage medium having code stored thereon, the code, when executed by a processor, causing the processor to implement a method comprising:

receiving a set of filtered values describing weight or pressure applied on axles of a vehicle at a first time;

determining, from the set of filtered values, one or more weight values for the respective axles;

determining a change in a weight distribution of the vehicle by comparing, by a computer located in the vehicle, the one or more weight values to weight values of the vehicle acquired at a time that is later than the first time;

determining, by the computer, a driving-related operation of the vehicle based on the change; and causing an autonomous driving operation of the vehicle to be performed by executing the driving-related operation.

18. The non-transitory computer-readable program storage medium of claim 17, wherein the one or more weight values describe pressure applied in multiple tires of the vehicle.

19. The non-transitory computer-readable program storage medium of claim 17, wherein the set of filtered values are filtered by performing an error detection and removal operation on a first set of values obtained from a first set of sensors coupled to axles of the vehicle and a second set of values obtained from a second set of sensors coupled to tires or wheels of tires of the vehicle.

20. The non-transitory computer-readable program storage medium of claim 17, wherein determining the driving-related operation of the vehicle includes determining a maximum steering angle to operate the vehicle based on the set of filtered values.

* * * * *